United States Patent
Baroffio

(10) Patent No.: US 8,364,960 B2
(45) Date of Patent: Jan. 29, 2013

(54) METHOD FOR PREVENTING THE USE OF A CLONED USER UNIT COMMUNICATING WITH A SERVER

(75) Inventor: Ivan Baroffio, Renens (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 246 days.

(21) Appl. No.: 12/801,803

(22) Filed: Jun. 25, 2010

(65) Prior Publication Data

US 2010/0332829 A1 Dec. 30, 2010

Related U.S. Application Data

(60) Provisional application No. 61/220,628, filed on Jun. 26, 2009.

(30) Foreign Application Priority Data

Jul. 15, 2009 (EP) .................................... 09165496

(51) Int. Cl.
*G06F 21/00* (2006.01)

(52) U.S. Cl. .............. 713/168; 705/44; 705/64; 726/19; 726/23; 370/389; 455/411

(58) Field of Classification Search .................... 713/168
See application file for complete search history.

(56) References Cited

U.S. PATENT DOCUMENTS

| | | | | |
|---|---|---|---|---|
| 5,903,882 | A * | 5/1999 | Asay et al. ....................... | 705/44 |
| 6,895,507 | B1 * | 5/2005 | Teppler ........................... | 726/19 |
| 7,565,550 | B2 * | 7/2009 | Liang et al. ..................... | 713/188 |
| 7,853,533 | B2 * | 12/2010 | Eisen ............................... | 705/64 |
| 2004/0181666 | A1 * | 9/2004 | Candelore ...................... | 713/160 |
| 2005/0239440 | A1 | 10/2005 | Chen et al. | |
| 2006/0107323 | A1 | 5/2006 | McLean | |
| 2007/0283162 | A1 | 12/2007 | Nonaka et al. | |
| 2009/0070593 | A1 * | 3/2009 | Boshra et al. .................. | 713/186 |

FOREIGN PATENT DOCUMENTS

| WO | WO 2006/055545 | 5/2006 |
|---|---|---|
| WO | WO 2007/096735 | 8/2007 |

\* cited by examiner

*Primary Examiner* — Taghi Arani
*Assistant Examiner* — Mahfuzur Rahman
(74) *Attorney, Agent, or Firm* — Harness, Dickey & Pierce, P.L.C.

(57) ABSTRACT

A method to fight against cloning attacks is disclosed. In an initialization phase, the user unit sends to the server a request comprising a unique identifier of the user unit, check data, an initial payload key and a request instruction encrypted with a payload key retrieved from a memory of the user unit. Each time the server receives a request; the request instruction is decrypted by a payload key retrieved from a memory according to the unique identifier of the user unit. The server then generates a derivation key to be used by the user unit to compute a new payload key and checks in the next incoming request from the same user unit if the payload key is an expected one. The server detects cloning attacks thanks to a status parameter at decryption of the request instruction with the expected payload key.

20 Claims, 3 Drawing Sheets

METHOD FOR PREVENTING THE USE OF A CLONED USER UNIT COMMUNICATING WITH A SERVER

CROSS-REFERENCE TO RELATED APPLICATIONS

This application claims priority under 35 U.S.C. §119 to U.S. Provisional Application number U.S. 61/220,628 filed on Jun. 26, 2009 as well as European Patent Application number EP 09165496.2 filed on Jul. 15, 2009 the entire contents of each of which are incorporated herein by reference.

FIELD OF THE INVENTION

The present invention relates to a method for detecting unauthorized user multimedia units to share access rights to a content distributed by a server via a communication network. In particular, when an unauthorized or a cloned unit is detected, countermeasures are foreseen to be activated in order to limit or disable the access to the server.

TECHNICAL BACKGROUND

Since the recent technical improvements in the field of broadband high data throughput networks and in the data processing devices, numerous solutions have been developed for fighting against fraudulent attempts to access to payload content data made available by servers in the network.

The content is exploited by user units or multimedia units defined herein as desktop or portable personal computers, digital television decoders, television sets, wireless terminals such as portable phones, etc. A specific client application such as, for example, a multimedia content player is installed in the user unit for listening or viewing audio/video content distributed by a server on the network. Conditional access and descrambling software and/or hardware modules complete the application for ensuring secure data processing within the unit.

The solutions adopted for preventing unauthorized access to payload content data on a network, are mainly based on a mutual authentication of the user unit with the content distribution server.

Document US20070283162A1 discloses a system and a method for detecting an unauthorized playback device. In a management server, a reception processing unit acquires a user terminal identifier and a first random number from a user terminal targeted for unauthorized playback device detection. The reception processing unit determines whether a second management server random number, which is stored in a storage unit in correspondence with the user terminal identifier, matches the first user terminal random number. If the two random numbers fail to match, a message indicating that a clone exists is displayed. If the two random numbers match, a terminal information generation unit of the management server generates a new random number, and writes this new random number as a second random number into the storage unit. The management server sends the second random number to the user terminal which updates the first user terminal random number to the second random number.

Document WO2006055545A2 discloses a system and method for providing secure communications between client communication devices and servers. A server generates a random offset, alters a server communication device dynamic credential by applying the random offset and stores the dynamic credential thus modified. The server sends, via a network, to a client communication device a signal including the random offset. The client communication device returns to the server a signal including a dynamic credential for verification by determining a difference between the server dynamic credential and the received dynamic credential. A presence of a cloned client communications device is detected on the basis of the difference.

Document WO2007096735A2 relates to mobile phones comprising each a personal token or SIM card used for authentication in a mobile telephony telecommunication network. The SIM card comprises a microprocessor, a memory, a stored secret key and a set of instructions for controlling the microprocessor into performing an authentication calculation on the basis of a received random number and on the basis of the stored secret key. The SIM card further includes a memory location dedicated for storing a counter value and instructions for making the counter value evolve each time the authentication calculation is performed. The counter value stored in the SIM card is compared with the counter value as received from a remote server performing the same authentication calculation as the SIM card. In case of mismatch between the two counter values, the SIM card is disabled and thus no more able to connect the mobile phone to the telecommunication network.

Document US2005239440A1 discloses a system comprising a plurality of client devices and a service provider. A client device is authenticated by using a one-time pad table stored in the client device, and a matching table maintained by the service provider. When a request for service is sent from the client to the service provider, the next unused pad is exchanged and verified with the current state of the service provider's copy of the table. If the one-time pad is the next unused code, service is granted, else the user is challenged to identify himself, which when successfully completed results in the client device being downloaded with a new one-time pad table, replacing the compromised table. Use of service by a cloned device causes the one-time pad table at the service provider to become out of synchronization with the authentic device's copy of the table, thereby setting up the ability to detect the fraud, stop the service consumption by the clone, and reprogram the authentic device to allow for uninterrupted service.

In case of interferences in the data transmission through the network between the server and the user units, or other data corruption coming from calculation errors at large data volume and high throughput, the above methods of mutual authentication or of detection of cloned devices may lack of efficiency. In fact, incorrect response to connection requests sent to the server or failures in encryption/decryption operations as well at user unit as at server side may result to unexpected rejection of genuine user units from the network.

SUMMARY OF THE INVENTION

The present invention aims as well to prevent using of unauthorized or cloned devices to connect to content servers as to improve security performance and efficiency during broadband high volume data transmission by permanently checking authenticity of the user units. Even interferences or transmission errors occur; an authentic user unit is not necessarily rejected thanks to the use of a fallback procedure letting the server to adapt itself to this abnormal situation.

The aims are achieved by a method for detecting the use of a cloned user unit communicating with a server, said method comprising an initialization phase and a nominal phase of sending at least a request to said server and receiving at least a response from the server, the initialization phase comprising the steps of:
a) randomly generating an initial payload key by a user unit;
b) retrieve a payload key from a memory of the user unit, and check the value of said payload key
c) if the value of the payload key is at a default value, set the value of the payload key to the value of the initial payload key, storing locally the payload key into the memory of the user unit, and entering into the nominal phase by using the initial payload key as payload key,
d) if the value of the payload key is different from the default value, entering into the nominal phase by using the retrieved payload key,
the nominal phase of sending a request to the server and of receiving at least a response from the server comprising the steps of:
e) preparing in the user unit, a request to be sent to the server, said request containing at least a set comprising a unique identifier of the user unit, check data, and the initial payload key, the set being encrypted by a primary transmission key, and a request instruction encrypted by the payload key,
f) decrypting by the server the set with the primary transmission key, obtaining the unique identifier of the user unit, the check data and the initial payload key,
g) retrieving from the memory of the server an expected payload key and a fallback key corresponding to the unique identifier of the user unit, setting a status parameter to a OK state, and setting a temporary key to the value of the expected payload key,
h) decrypting the request instruction with the temporary payload key,
   if decryption of the request instruction is successful, logging the unique identifier, the check data and the status parameter at OK state in a register of the server,
   if decryption of the request instruction fails, setting the status parameter to a warning state, setting the temporary key to the value of the fallback key and decrypting the request instruction with the temporary key,
   if decryption of the request instruction with the temporary key is successful, logging the unique identifier, the check data and the status parameter at warning state in a register of the server,
   if decryption of the request instruction with the temporary key fallback key fails, setting the status parameter to an initial state, setting the temporary key to the value of the initial payload key and decrypting the request instruction,
   if decryption of the request instruction with the temporary key is successful, logging the unique identifier, the check data and the status parameter at initial state in a register of the server,
   if decryption of the request instruction with the temporary key fails, setting the status parameter to an error state, logging the unique identifier, the check data and the status parameter at error state in a register of the server,
i) Checking the unique identifier, the check data and the status parameter in the register of the server,
   if the status parameter is at the warning or initial or error state, verifying validity of the unique identifier of the user unit with the check data, and determining countermeasures or applying predefined rules according to the result of the verification,
j) randomly generating a new payload key, computing a derivation key by combining the temporary key and the new payload key,
k) storing the unique identifier, the new payload key as new expected payload key and the temporary key as new fallback key in the memory of the server,
l) Sending to the user unit a response to the request instruction comprising at least response data encrypted by the new payload key and the derivation key encrypted by a secondary transmission key,
m) in the user unit, retrieving the derivation key by decrypting with the secondary transmission key,
n) computing the new payload key by combining the derivation key and the payload key stored in the memory of the user unit, decrypting the response data with the obtained new payload key and storing the new payload key in the memory.
   If decryption of the response data with the new payload key fails, computing the new payload key by combining the derivation key and the initial payload key generated at step a), and storing the new payload key in the memory.

At each connection to the server, the user unit generates a random initial key and explores its memory to find a payload key stored after a previous connection to the server. Two cases may arise:
   The user unit is already known by the server either by a previous registration in a database of the server or by a previous connection to the server causing data exchanges with the user unit. In this case, the record comprises a unique identifier of the user unit such as a serial number, a MAC ((Media Access Control address) address or any identifier defining in a unique and reliable way a user unit on a network. For example a mobile phone is identified on the network with a device identifier IMEI (International Mobile Equipment Identity) and a SIM card identifier IMSI (International Mobile Subscriber Identity) for identifying the user. The record further comprises an expected payload key and a fallback key.
   The user unit is unknown or connects the first time to the server. In this case, the records may be either defined by enrolment in advance of a user interested to benefit from the services proposed by the server or at the first connection to the server by reception of a request including default values for the identifier and for the initial key.

A temporary key set to the value of the payload key retrieved from the record of the server or to the value of the initial key according to the above mentioned cases is then used to decrypt the request instruction. The server then computes a derivation key as response key which will be used by the user unit to compute a new payload key.

The derivation key is returned in a secure way i.e. encrypted with the secondary transmission key, to the user unit, so that only the user unit owning the payload key used to encrypt the request instruction previously sent is able to compute the new payload key. The latter is then stored on both the server and the user unit and will be used for the next exchanges.

Doing this way, the payload key is modified preferably during each data exchange between user unit and server, allowing thus the server to check in the next incoming request from the same user unit if the payload key is able to decrypt successfully the request instruction. The server also stores a fallback payload key, which is the last one used by the user unit. By checking status parameter at decryption with the expected payload key or with the fallback key, the server can, by applying predefined business rules, distinguish correct behaviors or authorized user units from unexpected system failures (network, storage, interferences, application software crash, etc.) and from true cloning attacks.

Several kinds of countermeasures may be applied when a cloned user unit has been detected such as blocking access to the server or disabling the application, services or resources used on the user unit to view content provided by the server.

An advantage of the method is that only one request from the user unit to the server followed by a response from said server to the user unit is necessary to detect a cloned user unit.

BRIEF DESCRIPTION OF THE FIGURES

The invention will be better understood with the following detailed description, which refers to the attached figure given as a non-limitative example.

DETAILED DESCRIPTION OF THE INVENTION

Figure 1:
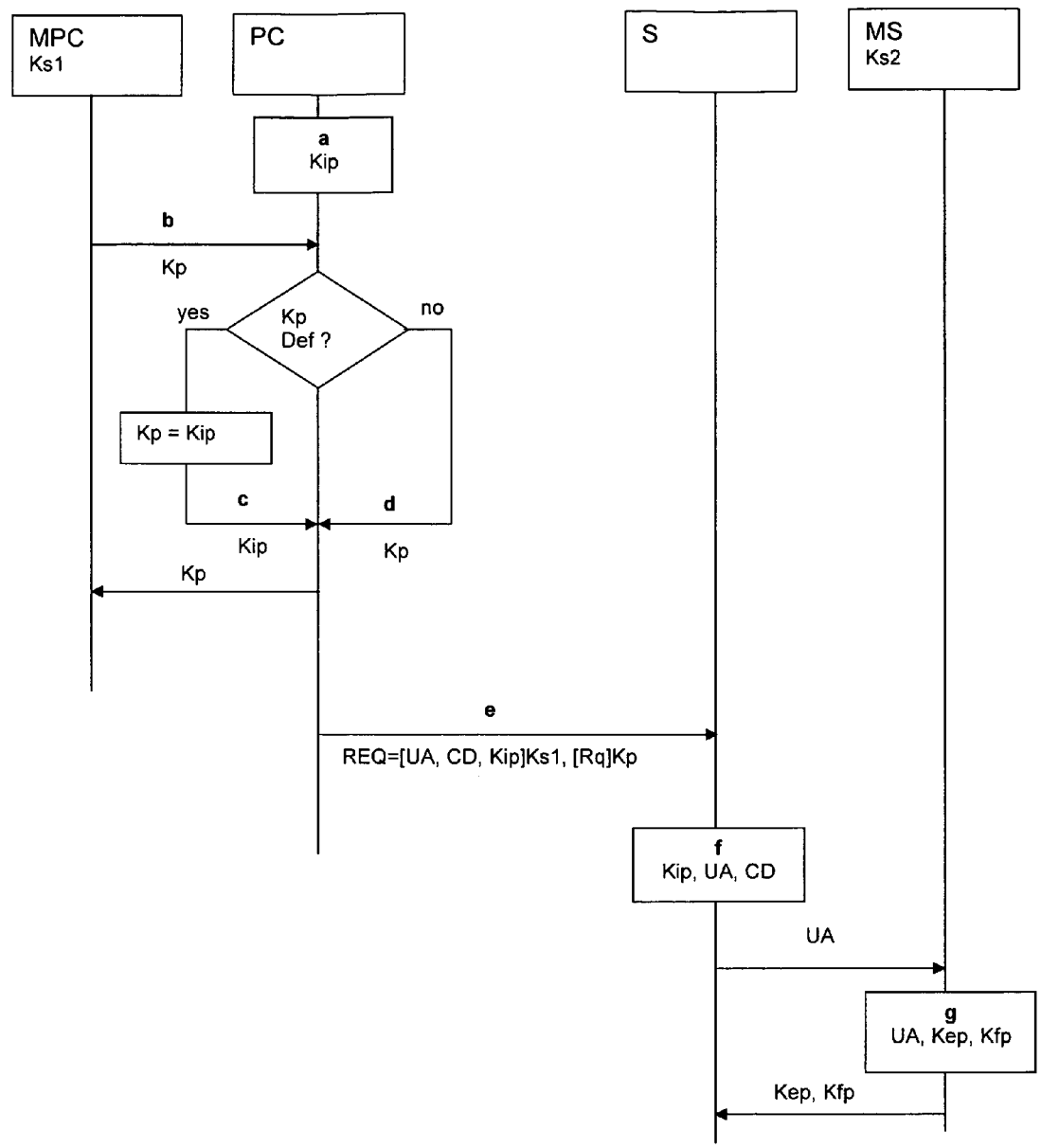
FIG. 1 shows a block diagram including steps of the initialization phase and the beginning of the nominal phase where the server retrieves an expected payload key and a fallback key from the memory.
Figure 2:
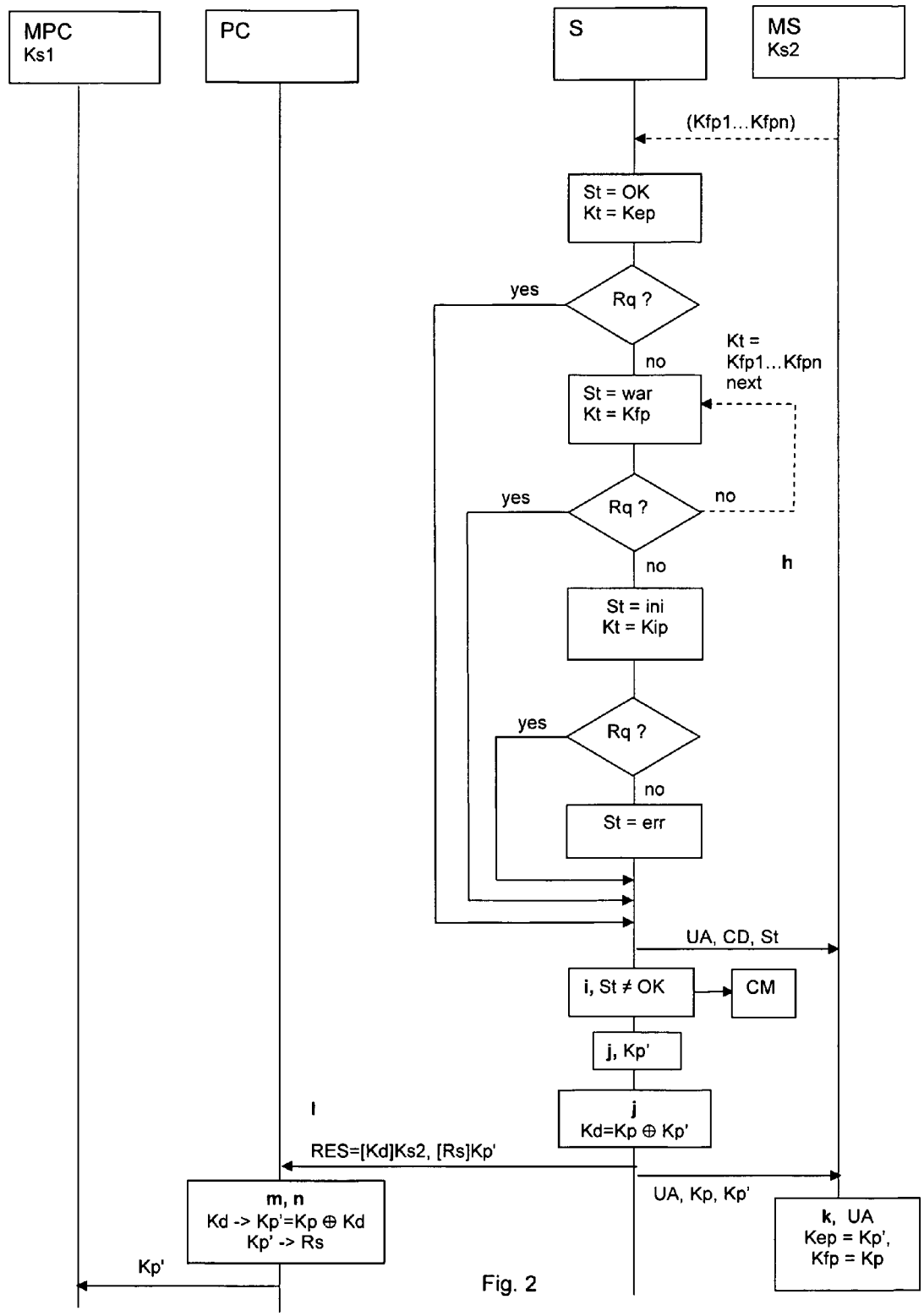
FIG. 2 shows a block diagram including steps of the nominal phase carried out for preventing a cloned user unit from accessing to content on a remote server which makes several tests to determine if the user unit is authorized or not.

The user units PC such as desktop or portable personal computers, digital television decoders, television sets, wireless terminals such as portable phones, etc are connected to a server S via a bidirectional wired or wireless communication network. Each of the user units PC and the server S are provided with a memory (MPC, MS) for storing keys, identifiers and other processing parameters. The block diagrams of FIG. 1 and FIG. 2 illustrate the different steps a) to n) of the method according to the invention with data stored by the user unit and the server in their respective memory and data exchanged between them in form of a request and a corresponding response.

The initialization phase is completed by the definition of a transmission key Ks1 which may be global for all or a group of user units PC accessing to the server S or individual for each user unit. A global transmission key is defined by the server which sends it to a user unit when the enrolment of a user is terminated or it may be preloaded in the user unit and in the server so that the server has not to distribute it. An individual transmission key is defined either by the server or the user unit and sent to the user unit respectively to the server at user enrolment and stored in the record together with the corresponding user unit unique identifier UA. As the global transmission key, the individual transmission keys may be preloaded in the user units and in the server.

In a preferred embodiment the value of the transmission key used for sending the request from the user unit to the server is not the same than the one of the transmission key sent in the response from the server to the user unit. The transmission key is therefore defined by a primary and a secondary transmission key (Ks1, Ks2). The primary transmission key Ks1 may be a public key from an asymmetric transmission key pair and the secondary transmission key Ks2 the corresponding private key or vice versa. Optionally the primary and secondary transmission keys (Ks1, Ks2) may have the same value when it handles on a symmetric transmission key.

The user unit PC is initialized at steps a to d by generating and storing in the memory MPC an initial payload key Kip. This key Kip may be obtained either by a random generator or by calculation using mathematical functions on predefined values or taken from a preprogrammed list.

The user unit PC retrieves a payload key Kp from its memory MPC and checks its value. Two cases may arise:

1) The value of the payload key Kp in the memory MPC is at a default value or null. This occurs when the user unit connects for the first time to the server or when its memory has been reinitialized so that all parameters, keys and data are at a default value. In this case, the value of the payload key Kp is set to the value of the initial payload key Kip previously generated. This payload key Kp is then stored in the memory MPC.

2) The value of the payload key is different from the default value, i.e. the user unit has already been connected to the server or has received a payload key Kp from an external source.

When the payload key is defined either as the initial payload key Kip or as a payload key Kp retrieved from the memory of the user unit, the user unit enters the nominal phase of its authentication.

In order to be authenticated by a server S or recognized as a genuine user unit PC unique on the network, the user unit PC sends a request REQ to the server S which will return a response RES and authorize access when all verification operations have been successful.

The request REQ comprises a first part consisting of a set including the unique identifier UA, check data CD and the initial payload key Kip, this set being encrypted by a primary transmission key Ks1 known by the server S and the user unit PC and a second part made up of a request instruction Rq encrypted by the payload key Kp. The check data CD is a bit string, a digest or a fingerprint obtained by applying a hash function or other mathematical function on attributes such as unique identifier UA, type, hardware and software configuration, software version, etc. of the user unit allowing the server S recognizing the user unit by performing verification on the basis of those attributes.

The transmission key Ks may be either of symmetrical or asymmetrical type in which case, each user unit PC stores its private key and a public key of the server S while the server stores its private key and the public keys corresponding to each user unit listed in the records by the unique identifier UA. Symmetric keys, can be unique for a given user unit or global, for all or a group of the user units.

The request REQ=[UA, CD, Kip]Ks, [Rq]Kp thus obtained is sent to the server S, (step e) which decrypts the set [UA, CD, Kip] with the transmission key Ks1 for obtaining the unique identifier UA, the check data CD and the initial payload key Kip (step e).

The unique identifier UA is used by the server S to retrieve from its memory MS a corresponding expected payload key Kep and a fallback key Kfp. The server S sets a status parameter St value to a state and a temporary key Kt to the value of the expected payload key Kep, (step f).

Then the server tries to decrypt the request instruction [Rq]Kp with the temporary key Kt having the value of the expected payload key Kep (step h).

If the decryption is successful, the server logs in a register the record made up of the unique identifier UA, the check data CD and the status parameter value.

If the decryption of the request instruction Rq fails with the expected payload key Kep, the status parameter St is set to a warning state and the server sets the temporary key Kt to the fallback key Kfp to try to decrypt the request instruction Rq. If the decryption is successful the server logs in the register the record made up of the unique identifier UA, the check data CD and the status parameter value (warning).

If the decryption of the instruction Rq fails with the fallback key Kfp, the status parameter St is set to an initial state and the temporary key Kt is set to the value of the initial payload key Kip.

The server tries to decrypt the request instruction Rq with the initial payload key Kip. If successful, the unique identifier UA, the check data CD and the status parameter St value (init) are logged in the register.

If the decryption with the initial payload key Kip fails, the status parameter St is set to an error state, the unique identifier UA, the check data CD and the status parameter St value (error) are logged in the register.

Before sending a response to the user unit the logs are checked to determine whether countermeasures have to be taken on the user unit, particularly when the recorded status value is different than OK, (step i). Depending on the result of the verification, other predefined rules may be applied such as access limited to specific services, access time limits or other restrictions.

The server verifies validity of the unique identifier UA on the basis of the check data CD when the status parameter St value is either at warning state, init state or at error state. If the recorded unique identifier UA does not give the correct check data CD by applying the appropriate function, then the user unit PC may be considered as a non authorized one. Other rules may be applied such as reinitialization, limited access to services proposed by the server, recording the unit in a black list, etc.

When the verification of the unique identifier UA is successful the user unit PC may be considered as an authorized one or, depending on the predefined rules, as a unit to observe and further steps are carried out for providing a response RES to the request REQ and a new payload key Kp'. The status parameter St value can thus be either at OK, warning, init or at error state. A new payload key Kp' is randomly generated and stored as a new expected payload key and the temporary key Kt used for decrypting the request instruction Rq is stored as fallback key Kfp. These keys stored together with the unique identifier UA will be then used at next connection of the user unit PC with the server S, step k.

At step j, a derivation key Kd is computed by combining the new payload key Kp' and the temporary key Kt by applying a reversible mathematical function such as exclusive or operation for example. The result thus obtained $Kd=Kt\oplus Kp'$ is encrypted by a secondary transmission key Ks2 corresponding to the primary transmission Ks1 used for encrypting the request REQ. The response to the request RES=[Kd]Ks2, [Rs]Kp' comprising at least the encrypted derivation key [Kd]Ks2 and response data [Rs]Kp' encrypted by the new payload key Kp' is sent to the user unit, (step l). The response data Rs may comprise rules, parameters, or instructions for the user unit depending on application. The user unit finally decrypts the derivation key Kd with the transmission key Ks2, (step m), the derivation key Kd thus obtained is combined with the payload key Kp stored in the memory of the user unit to obtain the new payload key Kp' thanks to the reverse of the function or the XOR operation. When the response data Rs is decrypted successfully with the new payload key Kp', the latter is stored in the memory MPC of the user PC. The new payload key Kp' either replaces the previously used payload key Kp, (step n) or it may be stored at an address distinct from the previously used payload key Kp which is then preserved.

If decryption of the response data with the new payload key fails, the user unit calculates a new payload key by combining the derivation key with the initial payload key.

The initial payload key Kip always sent to the server S in the request REQ has a double function: 1) initialization key for user unit initialization at first connection of the user unit and 2) backup or re-initialization key for restoring connection if decryption of the request or response data (Rq, Rs) with a payload key Kp or Kp' fails. In other words, such a failure occurs when the payload keys at user unit side and at server side do not correspond or are desynchronized.

1) User Unit First Initialization:

The user unit generates an initial key Kip which is also used as payload key Kp in the request REQ=[UA, CD, Kip]Ks, [Rq]Kp. The decryption with the temporary key Kt set to the expected payload key Kep and to the fallback payload key Kfp retrieved from the memory of the server with the unique identifier UA of the user unit PC fails. However, the decryption with the temporary key Kt set to the initial payload key Kip is successful and the status parameter is at init value. In this case, after analysis of the log records and if the rules allow, the process continues by the steps j to n. A new payload key Kp' is randomly generated by the server at step j and used to calculate the derivation key Kd which is sent to the user unit PC in the response RES. The user unit combines the payload key Kp with this derivation key Kd to determine the new payload key Kp'. Thus, the user unit PC and the server have the same payload key Kp' in their memory and are synchronized so that at a next connection with the server the status parameter value will be OK if no other errors occur. At next request to access to the server, the new payload key Kp' will be used and the user unit PC authenticated according to steps a) to n). The unique identifier UA of the user unit will allow the server retrieving the stored payload keys which are Kp' for the expected payload key Kep and if necessary the key Kip for the fallback key Kfp.

2) User Unit Re-Initialization

The user unit generates an initial payload key Kip and uses the payload key Kp retrieved from the memory of the user unit to protect part of the request REQ=[UA, CD, Kip]Ks, [Rq]Kp. The decryption with the temporary key Kt set to the expected payload key Kep and to the fallback payload key Kfp retrieved from the memory of the server with the unique identifier UA of the user unit PC fails. The decryption with the temporary key Kt set to the initial payload key Kip also fails and the status parameter is at error value. In this case, after analysis of the log records and if the rules allow, the process continues by the steps j to n. A new payload key Kp' is randomly generated by the server at step j and used to calculate the derivation key Kd which is sent to the user unit PC in the response RES. The user unit combines the initial payload key Kip with this derivation key Kd to determine the new payload key Kp'. Thus, the user unit PC and the server have the same payload key Kp' in their memory and are resynchronized so that at a next connection with the server the status parameter value will be OK if no other errors occur. At next request to access to the server, the new payload key Kp' will be used and the user unit PC authenticated according to steps a) to n). The unique identifier UA of the user unit will allow the server retrieving the stored payload keys which are Kp' for the expected payload key Kep and if necessary the key Kip for the fallback key Kfp.

Figure 3:
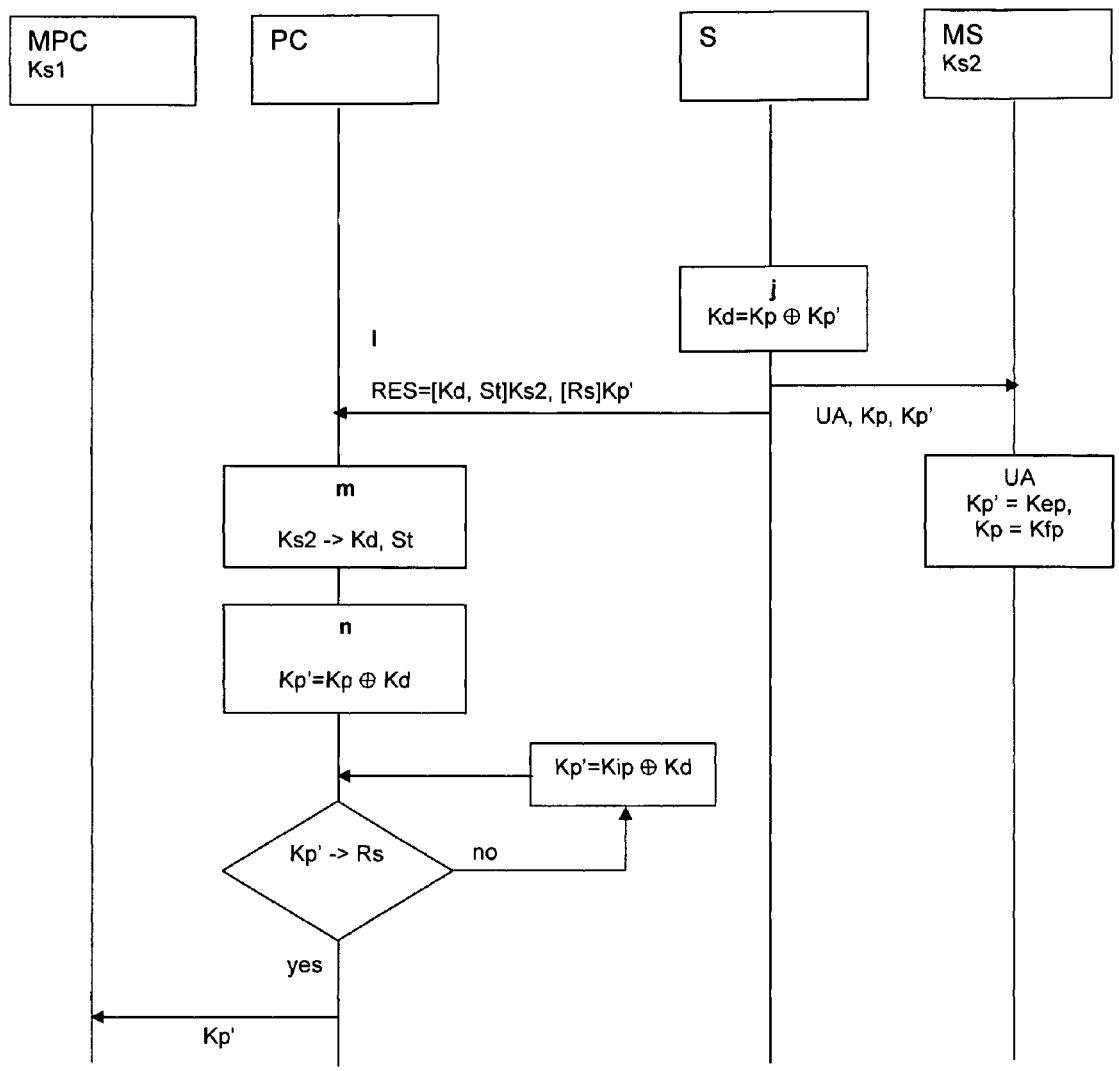
FIG. 3: shows an embodiment where the response from the server includes the status parameter which is handled by the user unit.

In an embodiment illustrated by FIG. 3, the response RES includes the status parameter St which may be exploited by the user unit according to its value. In this case, the status parameter St is preferably sent together with the derivation key Kd in a set which is encrypted with the transmission key Ks2. The response RES will thus be RES=[Kd, St]Ks2, [Rs] Kp', the status parameter St is then retrieved at the same time than the derivation key Kd by decryption with the transmission key Ks2.

A user unit is considered as authentic by the server when all verifications have been successful and particularly when the status parameter St value is at OK.

In case of a cloned user unit, one or several requests have already been made by the same user unit previously and payload keys corresponding to the user unit identifier UA have been stored in the record of the server S as expected and fallback keys (Kep, Kfp). The stored expected payload key Kep and fallback key Kfp have thus a value different from the default value set at the initialization phase, step a.

The decryptions of the request data Rq with the expected payload key Kep and with the fallback payload key Kfp lead to a status parameter St value at error so that the user unit PC is considered by the server as a cloned unit and therefore rejected or rather processed according to the predefined rules.

A user unit may also be considered as a clone when the status parameter value is at init. In fact, a same user unit may produce constantly a status parameter at init value by using permanently the initial payload key at each connection to the server. The countermeasures CM will also be defined according to the predefined rules and an analysis of the log register.

When a user unit produces constantly a status value at warning, it may also be considered as a clone. In fact, two user units having the same unique identifier UA may connect alternatively to the server so that, at step h, in each unit, the temporary key Kt is always set to the fallback key Kfp for decrypting successfully the request data Rq while decryption with the temporary key Kt set to the expected payload key Kep fails. In this case, countermeasures CM will also be defined by an appropriate rule.

Countermeasures CM applied in the server and/or on the user unit block access to the server or disable the application, services or resources in the user unit impeding viewing content provided by the server for example. According to an embodiment, the transmission of a response RES from the server S to the user unit PC is disabled, and the process stops at step i.

A further check of the unique identifier UA with the check data CD allows also to eliminate non authorized user units and the process may stop at step i.

According to an embodiment, each time the fallback key Kfp is used and the status parameter value is at warning a specific message may be displayed on the user unit. The server S may also count and store the number of warning status values for each unique identifier for system functioning statistics and history purposes. If the number of warnings exceeds a predefined limit during a predefined period, the server may apply countermeasures in a similar way than when a cloned user unit has been detected.

When the response RES includes a status parameter St value at error, the user unit calculates the new payload key Kp' by combining the derivation key Kd with the initial payload key Kip instead with the current payload key Kp. The aim is to obtain a payload key Kp' able to decrypt the response data Rs. If this new payload key Kp' allows the decryption, the user unit may be reinitialized so that it restarts the complete process by using the new payload key Kp' in place of the payload key Kp previously used.

Another possibility is to deny access to the server and display an error message on the user unit when the status parameter St value is found as to be at error after decryption with the transmission key Ks2. The decryption of the response data Rs with the new payload key Kp' issued from the derivation key Kd becomes in this case facultative.

At each request REQ followed by a response RES authorizing access to the server S, the payload key Kp is changed and the previous payload key is kept in the memory MS of the server S as reserve (fallback) key Kfp to be retrieved in case of corruption of the payload key Kp currently used. If a new payload key Kp' cannot be obtained in case of interferences in the server response, the previous payload key Kp can still be used as fallback key Kfp and the next generated payload key will be used for a standard access to the server. Optionally the previous payload key Kp may also be stored in the memory of the user unit.

According to an embodiment, the server S stores all payload keys used by the user unit for accessing the server S as fallback keys (Kfp1, ..., Kfpn). If the request data Rq cannot be decrypted by the last i.e. the most recent payload key stored as fallback key Kfp1, the server will set the temporary key Kt to the value of each preceding payload key until a successful decryption of the request data Rq can be performed. In such a case, the status is set to the warning state as when the most recent fallback key Kfp1 is used successfully. If none of the keys stored as fallback key is able to decrypt the request data Rq, the status parameter value is set to the initial state and the temporary key is set to the value of the initial payload key ( ). FIG. 2 shows this embodiment by the dashed arrow at the test of the fallback key kfp in step h. The further steps (j to n) of the method are then carried out as described above in the main embodiment.

In an embodiment, the derivation key Kd may correspond to the new payload key Kp' so that no further calculations are carried out by the user unit PC for determining the new payload key Kp'. As in the first embodiment, the new payload key Kp' and the response RES are preferably encrypted by the transmission key Ks2.

In a further embodiment an acknowledgement message may be sent from the user unit PC to the server S when the user unit PC receives a response from the server S.

According to a further embodiment at least one of the request sent from the user unit to the server, the response sent from the server to the user unit, the payload key the derivation key Kd are signed. The signature, preferably encrypted by the transmission key Ks1, is made up of a digest obtained for example by a one way collision free function of hash type applied over the data to verify: request, response, the payload key, the response key or derivation key. After decryption, the received digest is compared with a locally generated digest and when the comparison is successful the process continues. Otherwise, the process may either be repeated from the beginning or stopped by the server which sends suitable error messages to the user unit.

The method of the invention can be implemented in numerous applications requiring an authentication of a user unit with a remote server before accessing to services provided by the server.

For example, in broadband television application via wired or wireless bidirectional network, the request sent by the user unit (set top box, personal computer, mobile phone, etc.) to the server (head end, managing center, internet television services provider, etc.) comprises beside the payload key and instructions, several parameters related to the television application. These parameters comprise user particulars, access rights to television programs, channels or services linked with a subscription acquired by the user, rights and application software update requests, etc. The response returned by the server includes response data Rs comprising the application specific requested parameters such as rights acknowledgements or updates, application software updates etc.

In an embodiment of implementation, the authentication and clone detection procedure may be set as preamble in a more complex user login procedure requiring additional data exchanges between user unit and server. The login procedure will therefore be launched only after the user unit has been recognized by the server as an authentic user unit.

The invention claimed is:

1. A method for detecting the use of a cloned user unit communicating with a server, said method comprising an initialization phase, a nominal phase of sending at least a request to said server and receiving at least a response from the server, the initialization phase comprising the steps of:
   a) randomly generating an initial payload key by a user unit,
   b) retrieving a payload key from a memory of the user unit, and checking the value of said payload key,
   c) if the value of the payload key is at a default value, set the value of the payload key to the value of the initial payload key, storing locally the payload key into the memory of the user unit, and entering into the nominal phase by using the initial payload key as payload key,
   d) if the value of the payload key is different from the default value, entering into the nominal phase by using the retrieved payload key, the nominal phase of sending a request to the server and of receiving at least a response from the server comprising the steps of:
   e) preparing in the user unit, a request to be sent to the server, said request containing at least a set comprising a unique identifier of the user unit, check data, and the initial payload key, the set being encrypted by a primary transmission key, and an instruction encrypted by the payload key,
   f) decrypting by the server the set with the primary transmission key, obtaining the unique identifier of the user unit, the check data and the initial payload key,
   g) retrieving from the memory of the server an expected payload key and a fallback key corresponding to the unique identifier of the user unit, setting a status parameter to a OK state, and setting a temporary key to the value of the expected payload key,
   h) decrypting the request instruction with the temporary payload key,
      if decryption of the request instruction is successful, logging the unique identifier, the check data and the status parameter at OK state in a register of the server,
      if decryption of the request instruction fails, setting the status parameter to a warning state, setting the temporary key to the value of the fallback key and decrypting the request instruction with the temporary payload key,
      if decryption of the request instruction with the temporary payload key is successful, logging the unique identifier, the check data and the status parameter at warning state in a register of the server,
      if decryption of the request instruction with the temporary payload key fails, setting the status parameter to an initial state, setting the temporary key to the value of the initial payload key and decrypting the request instruction,
      if decryption of the request instruction with the temporary payload key is successful, logging the unique identifier, the check data and the status parameter at initial state in a register of the server,
      if decryption of the request instruction with the temporary payload key fails, setting the status parameter to an error state, logging the unique identifier, the check data and the status parameter at error state in a register of the server,
   i) checking the unique identifier, the check data and the status parameter in the register of the server,
      if status parameter is at the warning or initial or at the error state, verifying validity of the unique identifier of the user unit with the check data, and determining countermeasures or applying predefined rules according to the result of the verification,
   j) randomly generating a new payload key, computing a derivation key by combining the temporary key and the new payload key,
   k) storing the unique identifier, the new payload key as new expected payload key and the temporary key as new fallback key in the memory of the server,
   l) sending to the user unit a response to the request comprising at least response data encrypted by the new payload key and the derivation key encrypted by a secondary transmission key,
   m) in the user unit, retrieving the derivation key by decrypting with the secondary transmission key,
   n) computing the new payload key by combining the derivation key and the payload key stored in the memory of the user unit, decrypting the response data with the obtained new payload key and storing the new payload key in the memory, and
      if decryption of the response data with the new payload key fails, computing the new payload key by combining the derivation key and the initial payload key generated at step a), and storing the new payload key in the memory.

2. The method according to claim 1, wherein the response from the server further includes the status parameter associated to the derivation key in a set, said set being encrypted with the second transmission key.

3. The method according to claim 1, wherein the derivation key corresponds to the new payload key.

4. The method according to claim 1, wherein at least one of the request sent from the user unit to the server, the response sent from the server to the user unit, the payload key, the derivation key are signed.

5. The method according to claim 2, wherein a specific message is displayed on the user unit each time the fallback key is used and the status parameter value is at warning.

6. The method according to claim 2, wherein the server counts and stores the number of warning status values for each unique identifier for system functioning statistics and history purposes.

7. The method according to claim 6, wherein the server applies countermeasures in a similar way than when a cloned user unit has been detected if the number of warnings exceeds a predefined limit during a predefined period.

8. The method according to claim 1, wherein an acknowledgement message is sent from the user unit to the server when the user unit receives a response from the server.

9. The method according to claim 1, wherein the countermeasure comprises a step of disabling the transmission of a response from the server to the user unit.

10. The method according to claim 2, wherein the user unit calculates a new payload key by combining the derivation key with the initial payload key when the response includes a status parameter value at error, the user unit being reinitialized and restarts the complete process by using the new payload key as payload key, said payload key being stored in the memory of the user unit.

11. The method according to claim 1, wherein the server stores all payload keys used by a user unit for accessing the server as fallback keys.

12. The method according to claim 11, wherein the server sets the temporary key to the value of each preceding payload key until a successful decryption of said request instruction if decrypting the request instruction fails with the most recent payload key stored as fallback key, the status parameter being set to the warning state.

13. The method according to claim 12, wherein the status parameter value is set to the initial state and the temporary key is set to the value of the initial payload key if decrypting the request datainstruction fails with each stored fallback key.

14. The method according to claim 1, wherein the primary transmission key is a public key from an asymmetric transmission key pair and the secondary transmission key the corresponding private key or vice versa.

15. The method according to claim 1, wherein the primary transmission key and the secondary transmission key are symmetric by having the same value.

16. The method according to claim 14, wherein the transmission keys are either global for all user units or a group of user units or individual for each user unit, said transmission keys being preloaded in the user units and in the server or defined at an enrolment of a user at the server.

17. The method according to claim 15, wherein the transmission keys are either global for all user units or a group of user units or individual for each user unit, said transmission keys being preloaded in the user units and in the server or defined at an enrolment of a user at the server.

18. The method according to claim 1, wherein steps e) to n) are performed in response to a single request from the user unit to the server.

19. A method for detecting the use of a cloned user unit communicating with a server, said method comprising an initialization phase, a nominal phase of sending at least a request to said server and receiving at least a response from the server, the initialization phase comprising the steps of:
   a) randomly generating an initial payload key by a user unit,
   b) retrieving a payload key from a memory of the user unit, and checking the value of said payload key,
   c) if the value of the payload key is at a default value, set the value of the payload key to the value of the initial payload key, storing locally the payload key into the memory of the user unit, and entering into the nominal phase by using the initial payload key as payload key,
   d) if the value of the payload key is different from the default value, entering into the nominal phase by using the retrieved payload key, the nominal phase of sending a request to the server and of receiving at least a response from the server comprising the steps of:
   e) preparing in the user unit, a request to be sent to the server, said request containing at least a set comprising a unique identifier of the user unit, check data, and the initial payload key, the set being encrypted by a primary transmission key, and an instruction encrypted by the payload key,
   f) decrypting by the server the set with the primary transmission key, obtaining the unique identifier of the user unit, the check data and the initial payload key,
   g) retrieving from the memory of the server an expected payload key and a fallback key corresponding to the unique identifier of the user unit, setting a status parameter to a OK state, and setting a temporary key to the value of the expected payload key,
   h) decrypting the request instruction with the temporary payload key,
      if decryption of the request instruction is successful, logging the unique identifier, the check data and the status parameter at OK state in a register of the server,
      if decryption of the request instruction fails, setting the status parameter to a warning state, setting the temporary key to the value of the fallback key and decrypting the request instruction with the temporary payload key,
      if decryption of the request instruction with the temporary payload key is successful, logging the unique identifier, the check data and the status parameter at warning state in a register of the server,
      if decryption of the request instruction with the temporary payload key fails, setting the status parameter to an initial state, setting the temporary key to the value of the initial payload key and decrypting the request instruction,
      if decryption of the request instruction with the temporary payload key is successful, logging the unique identifier, the check data and the status parameter at initial state in a register of the server,
      if decryption of the request instruction with the temporary payload key fails, setting the status parameter to an error state, logging the unique identifier, the check data and the status parameter at error state in a register of the server,
   i) checking the unique identifier, the check data and the status parameter in the register of the server,
      if status parameter is at the warning or initial or at the error state, verifying validity of the unique identifier of the user unit with the check data, and determining countermeasures or applying predefined rules according to the result of the verification,
   j) randomly generating a new payload key, computing a derivation key by combining the temporary key and the new payload key by applying a reversible mathematical function,
   k) storing the unique identifier, the new payload key as new expected payload key and the temporary key as new fallback key in the memory of the server,
   l) sending to the user unit a response to the request comprising at least response data encrypted by the new payload key, and a set including the derivation key and the status parameter associated to the derivation key, said set being encrypted by a secondary transmission key,
   m) in the user unit, retrieving the derivation key by decrypting with the secondary transmission key,
   n) computing the new payload key by combining the derivation key and the payload key by applying the inverse of the mathematical function, said payload key being stored in the memory of the user unit, decrypting the response data with the obtained new payload key thus obtained and storing the new payload key in the memory,
      if decryption of the response data with the new payload key fails, computing the new payload key by combining the derivation key and the initial payload key generated at step a), and storing the new payload key in the memory.

20. A method for detecting the use of a cloned user unit communicating with a server, said method comprising an initialization phase, a nominal phase of sending at least a request to said server and receiving at least a response from the server, the initialization phase comprising the steps of:
   a) randomly generating an initial payload key by a user unit,
   b) retrieving a payload key from a memory of the user unit, and checking the value of said payload key,
   c) if the value of the payload key is at a default value, set the value of the payload key to the value of the initial payload key, storing locally the payload key into the memory of the user unit, and entering into the nominal phase by using the initial payload key as payload key, d) if the value of the payload key is different from the default value, entering into the nominal phase by using the retrieved payload key, the nominal phase of sending a request to the server and of receiving at least a response from the server comprising the steps of:
e) preparing in the user unit, a request to be sent to the server, said request containing at least a set comprising a unique identifier of the user unit, check data, and the initial payload key, the set being encrypted by a primary transmission key, and an instruction encrypted by the payload key,
f) decrypting by the server the set with the primary transmission key, obtaining the unique identifier of the user unit, the check data and the initial payload key,
g) retrieving from the memory of the server an expected payload key and a fallback key corresponding to the unique identifier of the user unit, setting a status parameter to a OK state, and setting a temporary key to the value of the expected payload key,
h) decrypting the request instruction with the temporary payload key,
    if decryption of the request instruction is successful, logging the unique identifier, the check data and the status parameter at OK state in a register of the server,
    if decryption of the request instruction fails, setting the status parameter to a warning state, setting the temporary key to the value of the fallback key and decrypting the request instruction with the temporary payload key, wherein the server sets the temporary key to the value of each preceding payload key until a successful decryption of said request instruction if decrypting the request instruction fails with the most recent payload key stored as fallback key, the status parameter being set to the warning state,
    if decryption of the request instruction with the temporary payload key is successful, logging the unique identifier, the check data and the status parameter at warning state in a register of the server,
    if decryption of the request instruction with the temporary payload key fails, setting the status parameter to an initial state, setting the temporary key to the value of the initial payload key and decrypting the request instruction,
    if decryption of the request instruction with the temporary payload key is successful, logging the unique identifier, the check data and the status parameter at initial state in a register of the server,
    if decryption of the request instruction with the temporary payload key fails, setting the status parameter to an error state, logging the unique identifier, the check data and the status parameter at error state in a register of the server,
i) checking the unique identifier, the check data and the status parameter in the register of the server,
    if status parameter is at the warning or initial or at the error state, verifying validity of the unique identifier of the user unit with the check data, and determining countermeasures or applying predefined rules according to the result of the verification,
j) randomly generating a new payload key, computing a derivation key by combining the temporary key and the new payload key by applying a reversible mathematical function,
k) storing the unique identifier, the new payload key as new expected payload key and the temporary key as new fallback key in the memory of the server,
l) sending to the user unit a response to the request comprising at least response data encrypted by the new payload key, and a set including the derivation key and the status parameter associated to the derivation key, said set being encrypted by a secondary transmission key,
m) in the user unit, retrieving the derivation key by decrypting with the secondary transmission key,
n) computing the new payload key by combining the derivation key and the payload key by applying the inverse of the mathematical function, said payload key being stored in the memory of the user unit, decrypting the response data with the obtained new payload key thus obtained and storing the new payload key in the memory,
    if decryption of the response data with the new payload key fails, computing the new payload key by combining the derivation key and the initial payload key generated at step a), and storing the new payload key in the memory.

\* \* \* \* \*